United States Patent [19]

Nakano et al.

[11] Patent Number: 4,486,634

[45] Date of Patent: Dec. 4, 1984

[54] GROUND TEST SWITCH FOR GAS INSULATED SWITCHGEAR

[75] Inventors: Haruji Nakano, Hitachiota; Satoshi Miwada, Ibaraki, both of Japan

[73] Assignee: Hitachi, Ltd., Tokyo, Japan

[21] Appl. No.: 426,085

[22] Filed: Sep. 28, 1982

[30] Foreign Application Priority Data

Sep. 30, 1981 [JP] Japan ................. 56-153626

[51] Int. Cl.³ .................. H01H 33/54; H01H 33/50
[52] U.S. Cl. .................. 200/148 R; 200/50 A; 200/148 B
[58] Field of Search .............. 200/50 R, 50 A, 148 R, 200/148 B

[56] References Cited

U.S. PATENT DOCUMENTS

| | | | |
|---|---|---|---|
| 2,660,694 | 11/1953 | Cuttino | 200/50 A |
| 3,089,928 | 5/1963 | Rexroad | 200/50 A |
| 3,249,708 | 5/1966 | Johnson | 200/50 A |
| 3,778,574 | 12/1973 | Clark | 200/148 B |
| 3,898,412 | 8/1975 | Robinson et al. | 200/50 A |

Primary Examiner—Robert S. Macon
Attorney, Agent, or Firm—Antonelli, Terry & Wands

[57] ABSTRACT

A ground test switch comprises a terminal plate electrically connected to a movable contact member but electrically insulated from a closed vessel enclosing a high-voltage conductor, a grounding conductor disconnectably electrically connecting the terminal plate to a member maintained at ground potential, and a locking device locking the movable contact member against movement when the grounding conductor is detached from the connecting position. The operator may forget to mount the grounding conductor in the switch again after a ground test. Such a trouble can be readily detected because the movable contact member is locked against movement.

5 Claims, 4 Drawing Figures

GROUND TEST SWITCH FOR GAS INSULATED SWITCHGEAR

This invention relates to a ground test switch for a gas insulated switchgear.

A gas insulated switchgear is known as an apparatus in which a high-voltage conductor is supported in electrically insulated relation in a closed vessel held at earth potential and is not exposed to the exterior of the closed vessel.

Such a gas insulated switchgear is provided with an earthing switch which ground the high-voltage conductor disposed in insulated relation in the closed vessel thereby ensuring the safety of maintenance and inspection.

This earthing switch is generally constructed to function also as a ground test switch used for the measurement of insulation resistance, contact resistance, etc. Such a ground test switch is generally mounted on the closed vessel though an electrical insulator, and a detachable grounding conductor is disposed in parallel with the electrical insulator so that the same ground potential as that of the closed vessel can be maintained by the grounding conductor. Therefore, when the grounding conductor is mounted in position, the switch can operate as the grounding switch earthing the high-voltage conductor, while when the grounding conductor is detached from the position, the switch can operate as the ground test switch.

Such a ground test switch is disclosed, for example, U.S. Pat. No. 3,778,574.

However, the inventors have clarified that a ground test switch of the kind disclosed has a problem as pointed out now.

The problem is attributable to detachment of the grounding conductor for the purpose of various measurements by the ground test switch. A gas insulated switchgear is generally provided with a plurality of ground test switches, and it is probable that the operator may forget to mount one of the plural grounding conductors after execution of various measurement tests. If such a situation occurs, the specific ground test switch will remain in the state electrically insulated from the closed vessel by the insulator. When the specific ground switch is operated to ground the high-voltage conductor under the above condition, an undesirable high voltage resulting in dielectric breakdown will be applied to the insulator, or such a voltage will remain applied across the ground test switch itself. Especially, in the latter case, the operator will be exposed to danger.

It is therefore an object of the present invention to provide a ground test switch for a gas insulated switchgear, which includes means for dealing with a possible operator's mistake.

Another object of the present invention is to provide a ground test switch which can ensure the safety of the operator even if he might make such a mistake.

Still another object of the present invention is to provide a ground test switch for a gas insulated switchgear, which permits simple mounting and detachment of the grounding conductor.

The ground test switch for a gas insulated switchgear according to the present invention comprises locking means for locking the movable contact member against movement in response to detachment of the grounding conductor. When a measurement test is completed in a condition in which the movable contact member in the ground test switch remains in its open position, the movable contact member is locked in that condition. In such a case, the ground test switch would not operate even when the switchgear is placed in operation without mounting of the grounding conductor in the ground test switch, and the chance of throwing the ground test switch is followed. The operator's mistake of forgetting mounting of the grounding conductor can therefore be readily discovered so that a fatal accident can be prevented before it occurs. On the other hand, when a measurement test is completed in a condition in which the movable contact member of the ground test switch remains in its closed position, the movable contact member is locked in that condition. Therefore, the operator's mistake of forgetting mounting of the grounding conductor can be readily discovered when the operator actuates the opening the ground test switch which is opened whenever a measurement test is conducted.

The above and other objects, features and advantages of the present invention will be apparent from the following detailed description of preferred embodiments thereof taken in conjunction with the accompanying drawings, in which.

Figure 1:
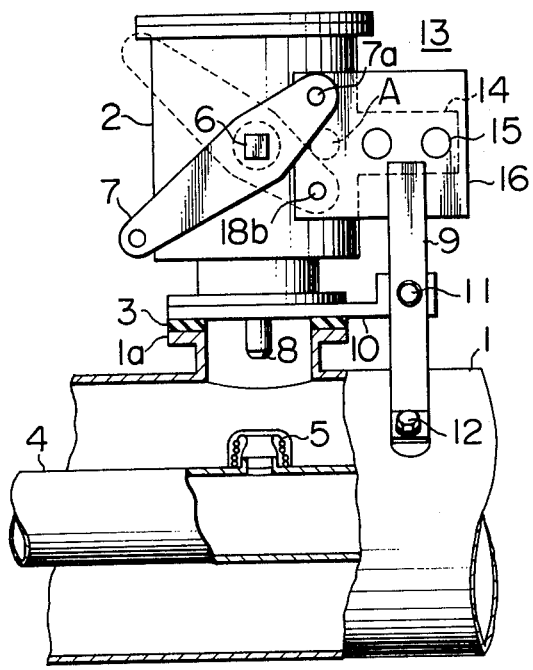
FIG. 1 is a partly sectional, front elevation view of a preferred embodiment of the ground test switch according to the present invention.
Figure 2:
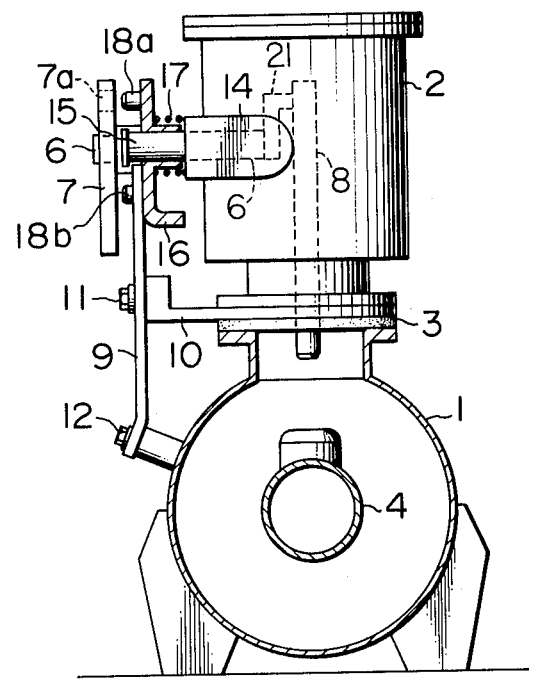
FIG. 2 is a side elevation view of FIG. 1.

FIGS. 1 and 2 show the structure of a preferred embodiment of the ground test switch according to the present invention. Referring to FIGS. 1 and 2, a high-voltage conductor 4 is disposed in a closed vessel 1 of a gas insulated switchgear and is fixedly supported in position by supporting members of an electrical insulator (not shown). Gas, for example, $SF_6$ gas is filled within the vessel 1. Further, this vessel 1 is grounded by a grounding wire (not shown). A flanged branch pipe extends from the closed vessel 1, and a casing 2 of the ground test switch is connected to the flange 1a through a ring 3 of an electrical insulator. A link mechanism 21 shown schematically in dotted line in FIG. 2 is incorporated in the switch casing 2. The input end of this link mechanism 21 is coupled to a drive lever 7 through a rotary shaft 6 which extends through the switch casing 2, and the output end of the link mechanism 21 is coupled to a movable contact member 8. In most cases, the drive lever 7 is made to act also as a manually actuated handle, and, in another case, the drive lever 7 is connected to an actuator. In each case, rotary movement of the drive lever 7 is converted into vertical movement of the movable contact member 8. A stationary contact member 5 is mounted on the high-voltage conductor 4 to make electrical contact with the movable contact member 8 when the latter is urged to its downwardmost position.

The switch casing 2 is electrically connected to the closed vessel 1 by a grounding conductor 9. More precisely, a terminal plate 10 is interposed between the insulating ring 3 and the switch casing 2 to make permanent electrical contact and electrical connection with the movable contact member 8 at the interior of the switch casing 2 and to be fixed by a bolt 11 to an intermediate portion of the grounding conductor 9 at the exterior of the switch casing 2. The electrical connection of the terminal plate 10 and the movable contact 8 is permanently maintained even though the movable contact 8 is movable with respect to the terminal plate. The lower end of the grounding conductor 9 is finally connected by a bolt 12 to the closed vessel 1. Thus, the movable contact member 8 is normally maintained at ground potential by the terminal plate 10, grounding conductor 9 and grounded closed vessel 1. In a modification of the structure above described, a terminal connected to the movable contact member 8 may be led out in electrically insulated relation from the switch casing 2 to be connected to the grounding conductor 9, or the grounding conductor 9 may be connected at its lower end to a member maintained at ground potential.

The ground test switch comprises a locking device 13 having a structure which will be described now.

As especially shown in FIG. 2, a pedestal 14 is mounted on the switch casing 2, and guides 15 fixed at one end thereof to the pedestal 14. A stopper carrier member 16 is fitted on the guides 15 so as to be movable over a predetermined distance in the axial direction of the guides 15. A pair of vertically spaced stopper pins 18a and 18b are formed on the front face of the stopper carrier member 16 which is normally urged toward the drive lever 7 by a spring 17 to move over the predetermined distance. Therefore, one of the two stopper pins 18a and 18b formed on the stopper carrier member 16 urged by the spring 17 is inserted into a mating hole 7a bored in the drive lever 7. More precisely, because of the provision of the two stopper pins 18a and 18b, one of the stopper pins 18a and 18b is inserted into the hole 7a of the drive lever 7 in either position of the drive lever 7, that is, when the drive lever 7 is either in its switch-open position shown by the solid line in FIG. 1 or in its switch-close or earthing position shown by the dotted line in FIG. 1.

In FIG. 2 showing the mounted state of the grounding conductor 9, the grounding conductor 9 is fixed to the terminal plate 10 and closed vessel 1 by the bolts 11 and 12 respectively, and its upper end extends to the locking device 13. It will be seen from FIG. 2 that the grounding conductor 9 is in the form of a flat plate, and its rear face and the front face of the stopper carrier member 16 lie in substantially the same plane, so that the stopper carrier member 16 is retracted by the grounding conductor 9 to the position at which it compresses the spring 17. Therefore, unless the grounding conductor 9 is detached, the stopper pin 18a or 18b is not inserted into the hole 7a of the drive lever 7. As is apparent, various elements or portions thereof serve for controlling the spring 17 including guides 15 for guiding the stopper carrier member 16, a front surface of the member 16, a portion of the grounding conductor 9 which contacts the front surface of the member 16 as well as the bolts 11 and 12, so as to maintain the spring in the compressed position.

On the other hand, when the grounding conductor 9 is detached for the purpose of measurement of, for example, the insulation resistance of the high-voltage conductor 4, the stopper carrier member 16 is urged toward the drive lever 7 by the force of the spring 17, and the stopper pin 18a or 18b is inserted into the hole 7a of the drive lever 7 placed in the switch-open position or earthing position, thereby locking the drive lever 7 against movement.

Therefore, even if the operator may then forget to mount the grounding conductor 9 in position again, the drive lever 7 remains locked against movement without giving rise to the trouble due to the absence of the grounding conductor 9, and the fact that the operator has forgot to re-mount the grounding conductor 9 can be detected from the immovability of the drive lever 7.

Figure 3:
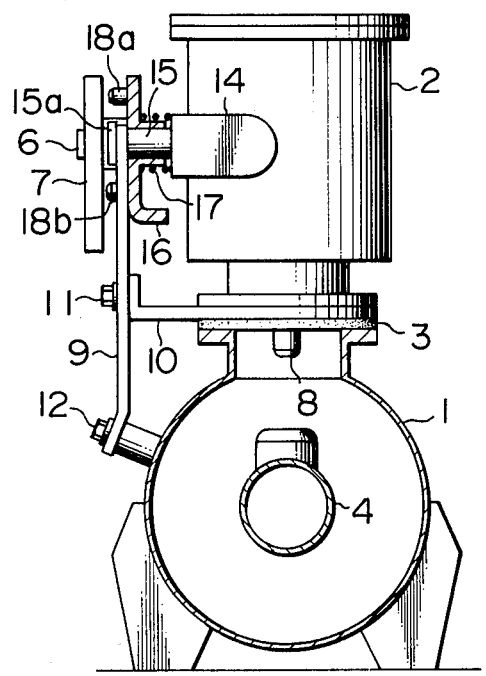
FIG. 3 is a side elevation view of another preferred embodiment of the ground test switch according to the present invention.
Figure 4:
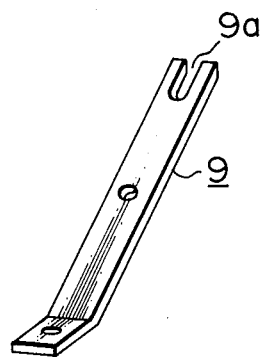
FIG. 4 is a perspective view of the grounding conductor in FIG. 3.

FIG. 3 shows the structure of another embodiment of the ground test switch according to the present invention. This second embodiment includes a modification of the locking device 13. In the first embodiment, the advancing movement of the stopper pins 18a and 18b urged by the spring 17 for locking the drive lever 7 against movement is blocked by the rigidity of the grounding conductor 9 detachably fixed to the switch casing 2 and closed vessel 1 by the respective bolts 11 and 12. The reliability of the locking function is further enhanced in this second embodiment. Referring to FIG. 3, a collar 15a is formed at the free or front end of the guide 15 fixed at the other end thereof to the pedestal 14. As shown in FIG. 4, a cut-out 9a is formed at the upper end of the grounding conductor 9, and the front end portion of the guide 15 is received in this cut-out 9a. The width of this cut-out 9a is selected to be slightly larger than the diameter of the guide 15 but smaller than the diameter of the collar 15a. Therefore, the upper end portion of the grounding conductor 9 is sandwiched between the collar 15a and the stopper carrier member 16 so as to reliably prevent advancing movement of the stopper carrier member 16 urged by the force of the spring 17. As soon as the grounding conductor 9 is detached, the stopper carrier member 16 is advanced by the spring 17, and the stopper pin 18a or 18b is inserted into the hole 7a of the drive lever 7 to lock the drive lever 7 against movement.

In order to ensure reliable insertion of the stopper pin 18a or 18b into the hole 7a of the drive lever 7 in this second embodiment, the portion of the grounding conductor 9 sandwiched between the collar 15a of the guide 15 and the stopper carrier member 16 has perferably a large thickness.

In this second embodiment, the thickness of the grounding conductor 9 is utilized to block the advancing movement of the stopper carrier member 16 urged by the spring 17, so that the member 16 can be stably maintained in the retracted position. This is effectively attained when especially the thickness of the portion of the grounding conductor 9 sandwiched between the collar 15a of the guide 15 and the stopper carrier member 16 is selected to be large.

Although, in each of the aforementioned embodiments, the stopper pin 18a or 18b is inserted into the hole 7a formed in the drive lever 7 thereby locking the drive lever 7 against movement, provision of the hole 7a is not in any way an essential requirement, and it may be replaced by any other suitable means for locking the drive lever 7 against rotary movement. For example, a single stopper may be erected at a position as shown by the dotted circle A in FIG. 1 to replace the hole 7a and two stoppers 18a, 18b. Alternatively, a movable member connected to the drive lever 7 and disposed in the position adjacent to the latter may be locked. Further, the shape of the grounding conductor 9 is not in any way limited to the flat or planar form. Furthermore, the present invention is also applicable to a ground test switch in which the drive lever is mounted at a different angle.

It is a common practice to make on-off switching tests on various switching units such as a circuit breaker, disconnecting switches and ground test switches constituting a gas insulated switchgear before or after making various measurements by the ground test switches. The ground test switch according to the present invention comprises locking means for locking the movable contact member 8 against on-off movement. Thus, this feature can be utilized so that the on-off switching tests above described are conducted after attainment of various measurements by the ground test switches. When the tests are conducted according to such a sequence, the operator's mistake, if any, of forgetting mounting of the grounding conductor 9 in one of the ground test switches after various measurements can be easily detected from the abnormal behavior of the specific ground test switch during the on-off switching tests conducted thereafter.

In the practice of the present invention, one end of the grounding conductor 9 may be connected to a member maintained at ground potential, other than the closed vessel 1. Further, although the switch casing 2 is electrically insulated from the closed vessel 1 by the insulator 3, the potential of the switch casing 2 may be the same as that of the closed vessel 1. However, the element such as the terminal plate 10 provided for electrically connecting the movable contact member 8 to the members maintained at ground potential must be electrically insulated from the closed vessel 1. The grounding conductor 9 may be disposed to be swingable around the bolt 12 so that the terminal plate 10 can be electrically isolated from the ground-potential members by the swinging movement of the conductor 9. Further, a member for blocking the advancing movement of the locking member 16 urged by the spring 17 may be provided separately from the grounding conductor 9 electrically connecting the terminal plate 10 to the ground-potential members so as to establish such a coupling relation that detachment of the grounding conductor 9 permits operation of the locking member 16.

We claim:

1. A ground test switch comprising:
   a closed vessel enclosing a high-voltage conductor therein and filled internally with an electrical insulating medium;
   a terminal plate electrically insulated from said closed vessel by an electrical insulator;
   a movable contact member electrically connected to said terminal plate and arranged to be movable toward and away from said high-voltage conductor;
   a detachable grounding conductor disconnectably electrically connecting said terminal plate to a member maintained at ground potential; and
   locking means operative for locking said movable contact member against movement in response to detachment of said grounding conductor from connection with said ground-potential member.

2. A ground test switch as claimed in claim 1, wherein said locking means includes a locking member movable toward a locking position locking said movable contact member against movement, a spring urging said locking member toward said locking position, and spring control means for holding said locking member in a non-locking position against the force of said spring when said grounding conductor is mounted to connect between said terminal plate and said ground-potential member, but releasing said locking member from the non-locking position to permit movement of said locking member urged by said spring when said grounding conductor is detached from the connecting position.

3. A ground test switch as claimed in claim 2, wherein said spring control means includes an integral extension of said grounding conductor.

4. A ground test switch comprising:
   a closed vessel enclosing a high-voltage conductor therein and filled internally with an electrically insulating medium;
   a stationary contact member mounted on said high-voltage conductor;
   a switch casing mechanically connected to a flange of a flanged branch pipe formed on said closed vessel at a position corresponding to said stationary contact member;
   a lever fixedly mounted on the external end of a rotary shaft rotatably extending through said switch casing;
   a movable contact member mechanically connected to the internal end of said rotary shaft through a link mechanism so as to be movable toward and away from said stationary contact member;
   a locking member movably mounted on said switch casing so as to be movable between a locking position locking said lever and a non-locking position unlocking said lever;
   spring means normally urging said locking member toward said locking position;
   a terminal plate electrically connected to said movable contact member but electrically insulated from said closed vessel by an electrical insulator; and
   grounding means for disconnectably electrically connecting said terminal plate to a member maintained at ground potential, said grounding means holding said locking member in said non-locking position against the force of said spring means when mounted to connect between said terminal plate and said ground-potential member, but releasing said locking member from said non-locking position to permit movement of said locking member urged by said spring means when detached from its connecting position.

5. A ground test switch comprising:
   a closed vessel enclosing a high-voltage conductor therein and filled internally with an electrical insulating medium;
   a stationary contact member mounted on said high-voltage conductor;
   a switch casing mechanically connected to a flange of a flanged branch pipe formed on said closed vessel at a position corresponding to said stationary contact member;
   a lever fixedly mounted on the external end of a rotary shaft rotatably extending through said switch casing;
   a movable contact member mechanically connected to the internal end of said rotary shaft through a link mechanism so as to be movable toward and away from said stationary contact member;
   a guide fixed at one end thereof to said switch casing and having a collar formed on the free end remote from the fixed end;
   a locking member movably fitted on said guide so as to be movable between a locking position locking said lever and a non-locking position unlocking said lever;
   spring means normally urging said locking member toward said locking position;

a terminal plate electrically connected to said movable contact member but electrically insulated from said closed vessel by an electrical insulator; and grounding means for disconnectably electrically connecting said terminal plate to a member maintained at ground potential, said grounding means being sandwiched at least a portion thereof between said collar of said guide and said locking member for normally holding said locking member in said non-locking position but permitting movement of said locking member toward said locking position when detached from the connecting position.

* * * * *